United States Patent
Beer

[11] Patent Number: 5,154,513
[45] Date of Patent: Oct. 13, 1992

[54] METHOD FOR DETERMINING THE TEMPERATURE OF A FLOW OF MEDIUM

[75] Inventor: Stefan Beer, Moeckmuehl, Fed. Rep. of Germany

[73] Assignee: Deutsche Forschungsanstalt fuer Luft- und Raumfahrt e.V., Fed. Rep. of Germany

[21] Appl. No.: 856,867

[22] Filed: Mar. 24, 1992

Related U.S. Application Data

[63] Continuation of Ser. No. 612,006, Nov. 9, 1990, abandoned.

[30] Foreign Application Priority Data

Nov. 14, 1989 [DE] Fed. Rep. of Germany ....... 3937784

[51] Int. Cl.[5] ............... G01K 13/02; G01K 11/00; G01K 1/14
[52] U.S. Cl. .................... 374/147; 73/861.61
[58] Field of Search ............ 374/147, 42, 45, 36, 374/37; 122/31.1, 4 D; 60/39.53, 39.55, 39.58, 39.59; 73/861.61

[56] References Cited

U.S. PATENT DOCUMENTS

| | | | |
|---|---|---|---|
| 3,363,460 | 2/1968 | Baumann | 374/42 |
| 4,474,140 | 10/1984 | Sternfeld et al. | 122/31.1 |
| 4,528,847 | 7/1985 | Halmi | 73/861.61 |
| 4,562,744 | 1/1986 | Hall et al. | 73/861.61 |
| 4,687,491 | 8/1987 | Latty | 122/4 D |
| 4,753,114 | 6/1988 | Jones, Jr. et al. | 73/861.61 |
| 4,854,249 | 8/1989 | Khinkis et al. | 122/4 D |

FOREIGN PATENT DOCUMENTS 2659742 7/1978 Fed. Rep. of Germany.

OTHER PUBLICATIONS

Fax et al, "Introduction to Fluid Mechanics" pg. 605-617 (1985)

*Primary Examiner*—William A. Cuchlinski, Jr.
*Assistant Examiner*—Gutierrez: Diego F. F.
*Attorney, Agent, or Firm*—Barry R. Lipsitz

[57] ABSTRACT

In order to improve a method for determining the quickly changing, average temperature of a flow of compressible medium such that it is possible to ascertain sudden changes in temperature accurately and with the least possible delay in time, it is suggested that the medium be caused to flow through a throttle point, that the mass flow of medium flowing through the throttle point be determined, that the pressure inside and upstream outside the throttle point be ascertained and that the average temperature be determined on the basis of the mass flow and the pressure inside and outside the throttle point.

9 Claims, 3 Drawing Sheets

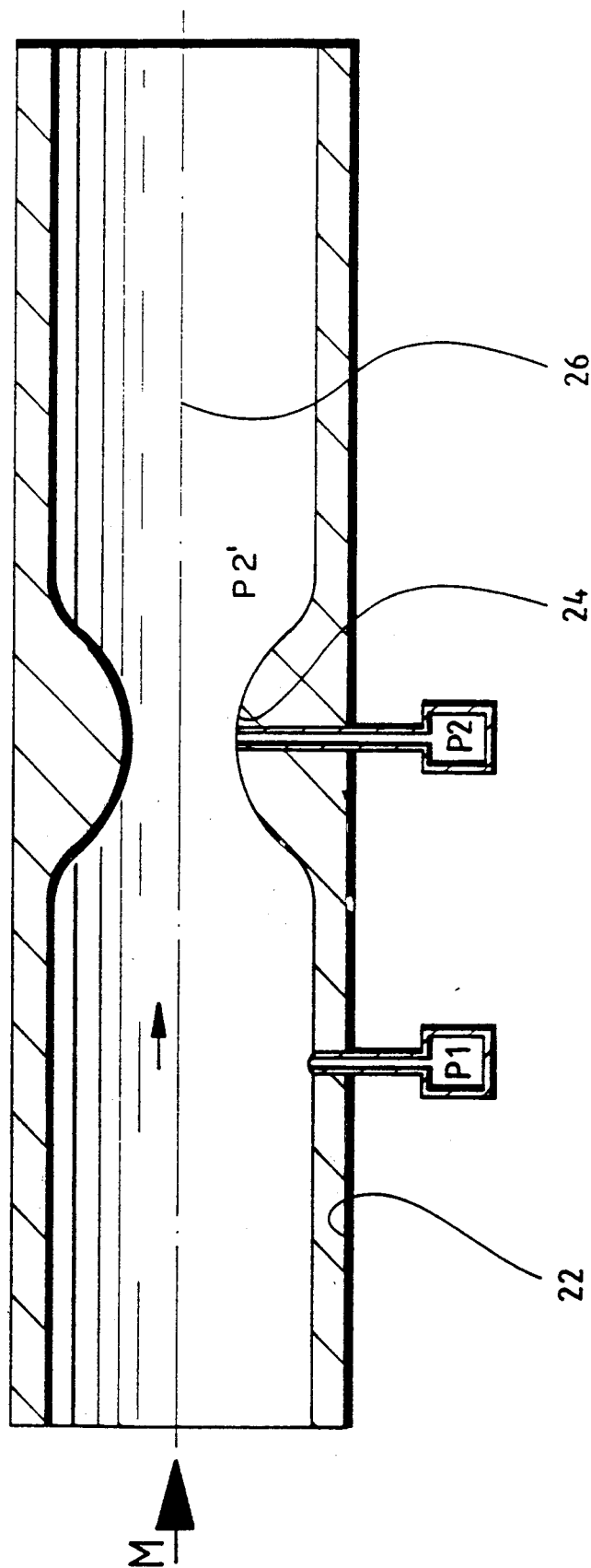

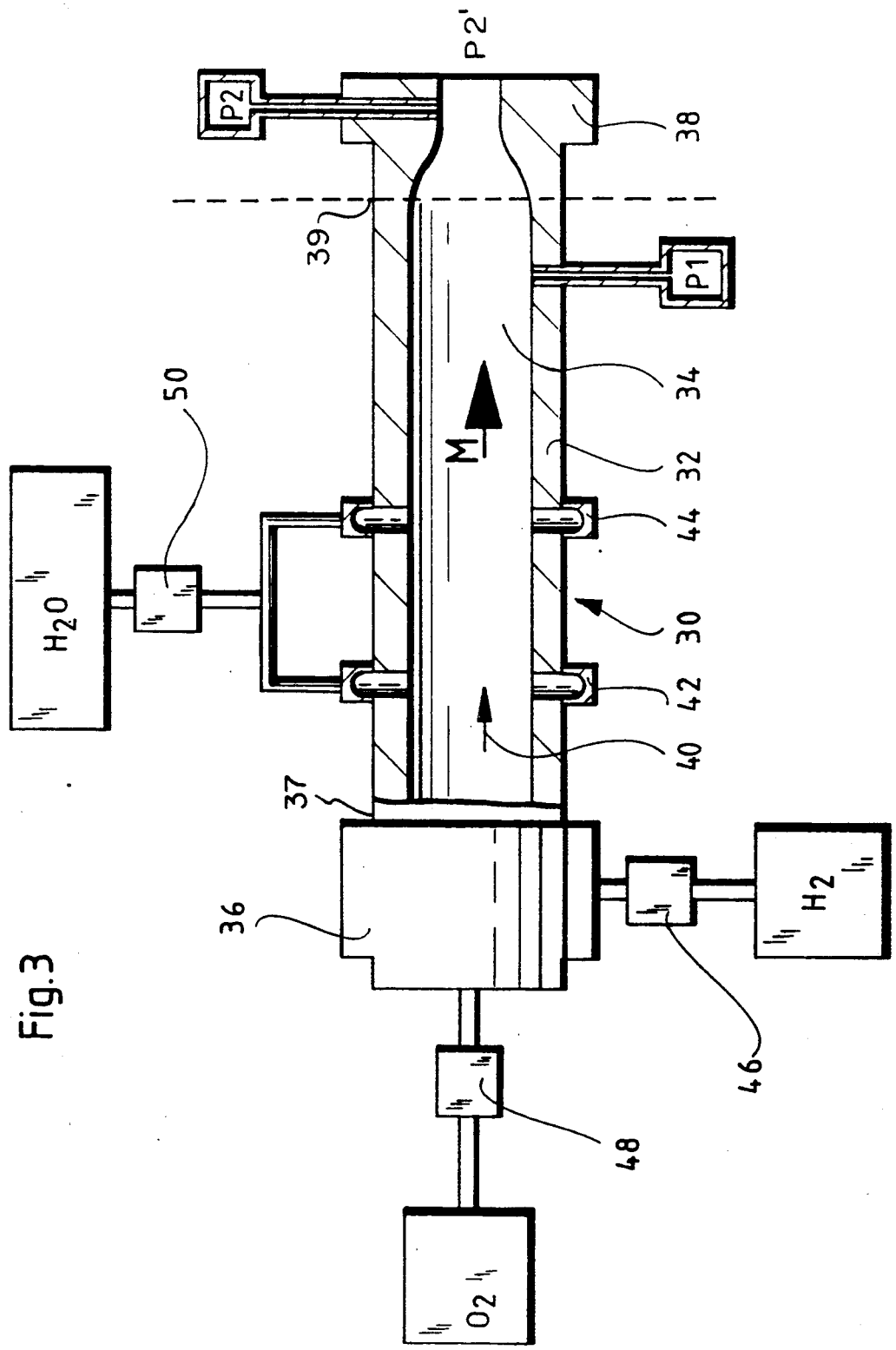

METHOD FOR DETERMINING THE TEMPERATURE OF A FLOW OF MEDIUM

This application is a continuation of U.S. patent application Ser. No. 07/612,006 filed on Nov. 9, 1990, now abandoned.

The invention relates to a method for determining the quickly changing, average temperature of a flow of compressible medium.

BACKGROUND OF THE INVENTION

In addition, the invention relates, in particular, to a method for determining the average temperature of the steam issuing from a steam generator, wherein a fuel is burned with an oxidizer in a combustion chamber of the steam generator and in addition water is injected into the combustion chamber.

The methods previously known for determining the quickly changing, average temperature of a flow of compressible medium always provide for direct measurement of the temperature itself, and the conventional temperature sensors, such as, for example, thermometers, are utilized.

The conventional temperature sensors have the disadvantage that they have relatively long response times and therefore sudden changes in temperature can be recreated only with delay so that problems always occur when temperature measurements of this type are to be taken into account in control processes.

The object underlying the invention is therefore to improve a method of the generic type such that it is possible to ascertain sudden changes in temperature accurately and with the least possible delay in time.

This object is accomplished in a method for determining the quickly changing, average temperature of a flow of compressible medium in that the medium is caused to flow through a throttle point, that the mass flow of the medium flowing through the throttle point is determined, that the pressure inside and upstream outside the throttle point is ascertained and that the average temperature is determined on the basis of the mass flow and the pressure, in particular the difference in the pressure inside and upstream outside the throttle point. This average temperature can be mathematically calculated from the values used for determination.

SUMMARY OF THE INVENTION

The advantage of the inventive method is to be seen in the fact that due to the customary pressure sensors required for ascertaining pressure a considerably shorter response time can be achieved since the response times of the pressure sensors are shorter than the response times of conventional temperature sensors by at least one order of magnitude. A substantial advantage is therefore attained. Moreover, the inventive method also has the great advantage that the average temperature determined with this method is the temperature averaged on the basis of the mass flow density. This has a great advantage when the flow of compressible medium has an inhomogeneous mass flow density since it has previously been possible to establish a temperature averaged on the basis of the mass flow density in such a case only by ascertaining the temperature and the flow velocity at several locations in the flow having an inhomogeneous mass flow density and then mathematically calculating the temperature averaged on the basis of the mass flow density.

The dependence of the average temperature on the pressures, i.e. in particular the difference in the pressures inside and upstream outside the throttle point, as well as on the mass flow is still encumbered by a constant which depends on the type of throttle point used and the geometric ratios upstream and downstream of the throttle point and by the type of medium.

In accordance with the invention, it is possible to mathematically determine this constant, whereby the exact geometry of the throttle point must be ascertained. However, it is particularly simple within the scope of the inventive solution for the constant to be determined experimentally. Within the scope of the inventive solution described thus far, no details have been given as to how the pressure upstream outside the throttle point is to be ascertained. This is measured as a static pressure upstream in front of the throttle point where there is no reduction in the cross-section. A particularly preferred possibility therefore provides for this pressure to be measured immediately upstream in front of the throttle point.

A particularly preferred embodiment of the inventive solution is one in which the throttle point is a nozzle at the opening in the end of a tube through which the compressible medium flows. In this case it is, in particular, conceivable, for ascertaining the pressure inside the narrowest point of the nozzle, to measure the pressure in the chamber which the flow of medium enters after leaving the nozzle, i.e. the pressure in the region downstream outside the nozzle.

Alternatively, it is also conceivable within the scope of the inventive solution for the throttle point to be a narrowed passage in a tube.

With respect to the design of the throttle point, no details have so far been given. The relationship between the mass flow and the difference in pressures inside and outside the throttle point can be established particularly simply when the throttle point has exit tangents parallel to its longitudinal axis.

The aforementioned object also applies for the methods previously known for determining the average temperature of the steam issuing from a steam generator.

This object is also accomplished in accordance with the invention for a method for determining the average temperature of the steam issuing from a steam generator, wherein a fuel is reacted with an oxidizer in a combustion chamber of the steam generator and in addition water is injected into the combustion chamber, in that a throttle point is provided at the end of the combustion chamber, the sum of the mass flow input is determined, the pressure inside and outside the throttle point is ascertained and the average temperature is determined on the basis of the mass flow issuing from the combustion chamber and the pressure inside and outside the throttle point.

It is of considerable significance, in particular in this special method, that the average temperature is the temperature averaged on the basis of the mass flow density since the steam within the combustion chamber flows with an inhomogeneous mass flow density but, for later use of the steam, the temperature averaged on the basis of the mass flow density, i.e. the temperature of the steam which is completely mixed and flows at a uniform velocity, is of importance.

In this method, in particular, the fuel is hydrogen and the oxidizer is oxygen.

Such steam generators are advantageously operated such that hydrogen and oxygen are supplied in a controlled manner in stoichiometric ratios.

In addition, in a particularly preferred embodiment of the inventive method, the mass flow inputs of the hydrogen and oxygen are determined on the basis of the measured values for the stoichiometric control thereof and, in addition, the mass flow input of the water injected into the combustion chamber is determined by way of the measuring device provided for controlling the injection of the water, so that altogether the the mass flow issuing from the combustion chamber results from sum of these mass flows.

Moreover, with respect to advantageous embodiments of the method for determining the average temperature of the steam issuing from a steam generator, reference is made to the particularly preferred embodiments which have been explained in conjunction with the method for determining the quickly changing average temperature of a flow of compressible medium.

BRIEF DESCRIPTION OF THE DRAWINGS

Additional features and advantages of the invention are the subject of the following description as well as the drawings depicting several embodiments. In these drawings:

FIG. 2 shows a second embodiment of the inventive method, used at a narrowed passage in a tube and FIG. 3 is a schematic illustration of a steam generator, in which the inventive method is utilized.

DETAILED DESCRIPTION OF THE INVENTION

Figure 1:
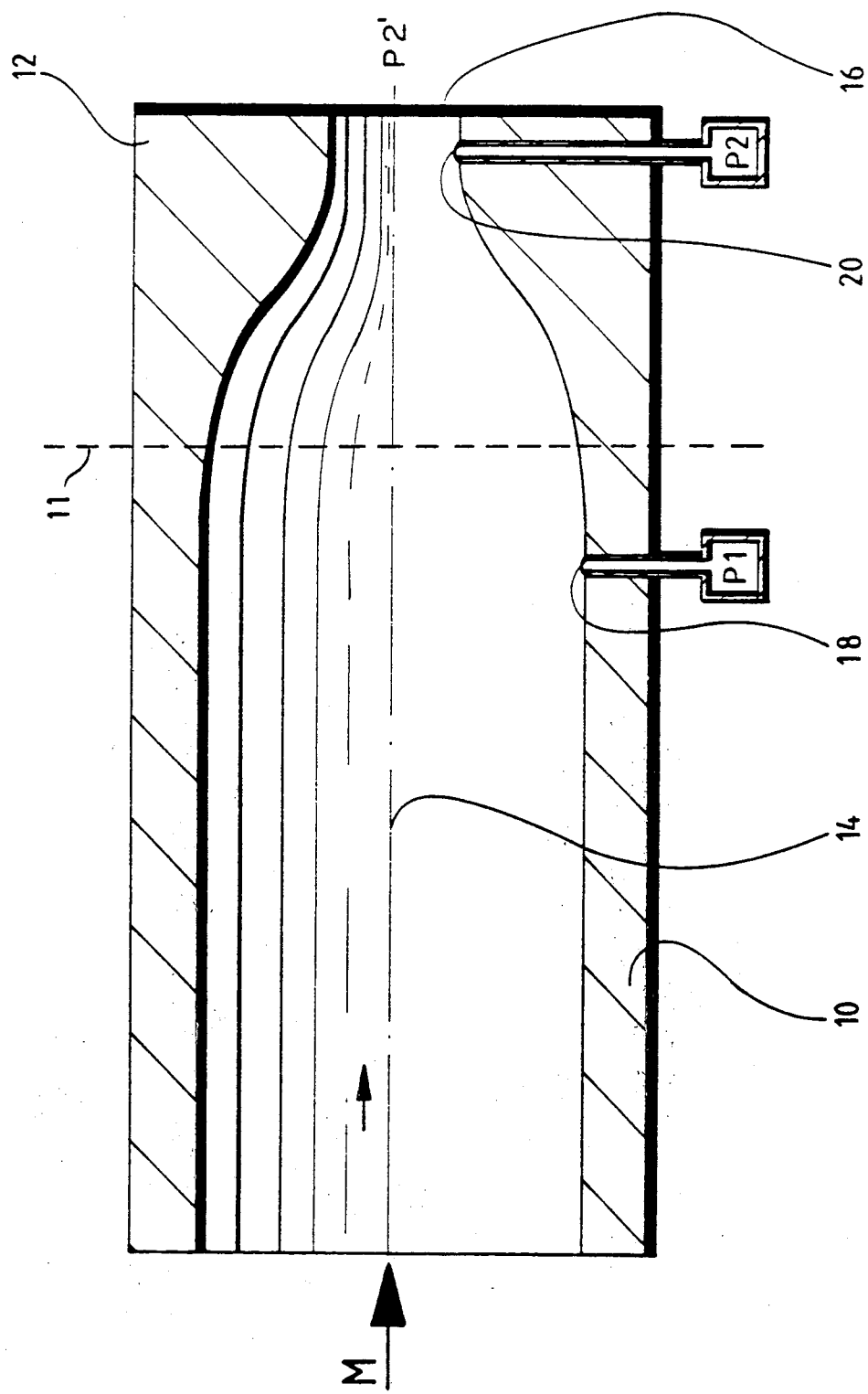
FIG. 1 shows a first embodiment of an inventive method, used in a tube closed by a nozzle.

In a first embodiment of an inventive method for measuring the quickly changing average temperature of a flow of compressible medium, as illustrated in FIG. 1, a mass flow M is conveyed through a tube 10 provided at the end 11 with a nozzle 12 which represents an outlet nozzle of the tube 10. The nozzle 12 is arranged so as to be rotationally symmetrical to a longitudinal axis 14 of the tube 10 and also has an aperture arranged concentrically to the longitudinal axis 14.

The pressure of the mass flow of compressible medium through the tube 10 is measured upstream of the nozzle 12, essentially in front of this nozzle, at a location 18 at which the tube 10 still has a full cross section. This pressure results in the measured value P1.

In addition, a pressure P2 is measured in the region of the narrowest cross section of the nozzle 12 at the location 20.

The average temperature of the flow of compressible medium from end 11 of tube 10 may be completely and accurately ascertained from the pressures P1 and P2 and the mass flow to be measured with any optional methods. In this respect, conventional pressure sensors can be used for measuring the pressures P1 and P2 and the equation of state of the medium $\sigma$ (p,T) must be known.

The advantage of the inventive method is to be seen in the fact that in the case of quickly changing temperatures measurement via the pressures P1 and P2 can be carried out considerably more quickly and accurately than by way of conventional temperature sensors, such as, for example, thermocouple elements, used for measuring temperature since the response times of the pressure sensors customarily used is shorter by at least one order of magnitude than the response times of the temperature sensors customarily used.

Alternatively to the first embodiment of the inventive method explained above, it is also possible, instead of measuring the pressure P2 within the nozzle 12, to measure the pressure P2' prevalent in the region outside the nozzle 12, i.e. downstream thereof, and then to determine the temperature in the same way as before with this value P2', the value P1 and the value of the mass flow. Those skilled in the art will appreciate that absent the effects of any external influences, the pressure P2' downstream of the nozzle will equal the pressure P2 within the nozzle, as well known in the field of fluid mechanics.

The theory of the one-dimensional isentropic nozzle flow is used for this calculation, and the average temperature T of the flow of compressible medium is in the following relation to the pressures P1 and P2 and the mass flow M, assuming ideal gas behaviour:

$$T = \frac{2\,(A\Psi P_1)^2}{M^2 ZR}$$

$$\Psi = \sqrt{\frac{\partial\sigma - \lambda}{\partial\sigma}} \sqrt{\left(\frac{P_2}{P_1}\right)^{\frac{\lambda}{\epsilon\sigma}} - \left(\frac{P_2}{P_1}\right)^{\frac{\partial\sigma+1}{\epsilon\sigma}}}$$

wherein $\chi$ = isentropic exponent
M = mass flow
A = nozzle cross-sectional area
Z = real gas factor Particularly advantageous for carrying out the inventive method are all forms of nozzle 12 which are well rounded and have an exit tangent parallel to the longitudinal axis 14.

In a second embodiment of the inventive method, the temperature of the flow of compressible medium is measured by way of a narrowed passage 24 provided in a tube 22 and which is also aligned coaxially to the longitudinal axis 26 of the tube 22. In principle, however, baffles or Venturi tubes can be used instead of the narrowed passage 24.

In the same way as in the first embodiment, a pressure P1 is measured upstream of the narrowed passage 24 and a pressure P2 is measured in the narrowed passage 24 at the location having the smallest cross section.

By establishing the mass flow through the tube 22, the temperature of the flow of compressible medium is calculated by also utilizing the pressures P1 and P2.

The inventive method is used, in particular, in a hydrogen-oxygen steam generator illustrated schematically in FIG. 3. This serves as an immediate reserve steam generator for power stations.

In this steam generator, designated in FIG. 3 as a whole as 30, a combustion chamber 34 surrounded by a housing 32 is provided and closed on one side 37 by an injection head 36 and, on the other side 39, by a nozzle 38.

Oxygen, on the one hand, and hydrogen, on the other, are injected into the combustion chamber 34 by way of the injection head 36 in the form of a mixing jet and then combusted in the chamber so that steam results. This steam is cooled by water being additionally injected into the combustion chamber 34 by way of injection rings 42 and 44 located downstream of the injection head 36 in the direction of flow 40. The amount of water injected is such that this is also vaporized due to the heat available and forms a flow of steam together with the steam from the hydrogen-oxygen combustion. This flow leaves the combustion chamber 34 at end 39 thereof through the nozzle 38 as mass flow M. The mass flow is hereby determined in the simplest manner by way of the measuring means 46 and 48, respectively, which are in any case necessary for the stoichiometric supply of hydrogen and oxygen and which ascertain the mass flows of hydrogen and oxygen supplied for combustion in the combustion chamber 34, as well as by a measuring means 50 also required for cooling of the steam, which serves to ascertain the mass flow of water injected through the injection rings 42 and 44 into the combustion chamber 34 for cooling the steam and is likewise required in a steam generator of this type for regulating the amount of water injected.

The pressures P1 and P2 are measured with conventional pressure sensors which, as already mentioned in conjunction with the first embodiment, allow temperatures to be determined substantially more quickly, in the case of quickly changing temperatures, than with the customary measurement of temperatures by means of thermocouple elements.

Alternatively, it is also possible to measure the pressure P2 outside the nozzle 38.

Moreover, reference is made to the comments on the first embodiment with respect to the design of the nozzle 38.

When the steam generator 30 is used in a power station, a narrowed passage, similar to the narrowed passage 24, is provided instead of the nozzle 38 and a tube then leads to a steam turbine from in front of this narrowed passage.

The present disclosure relates to the subject matter disclosed in German application No. P 39 37 784.9 of Nov. 14, 1989, the entire specification of which is incorporated herein by reference.

What is claimed is:

1. A method for determining the quickly changing, average temperature of a flow of compressible medium within a conduit, comprising the steps of:
   providing a throttle point at an end of said conduit;
   passing said medium through said throttle point,
   determining the mass flow of said medium flowing through said throttle point,
   ascertaining the pressure inside and upstream outside said throttle point, and
   determining the average temperature of said flow of medium input to said throttle point on the basis of said mass flow and said pressure inside and upstream outside said throttle point.

2. A method as defined in claim 1, wherein the measurement of the pressure upstream outside said throttle point is taken immediately upstream in front of said throttle point.

3. A method as defined in claim 1, wherein said throttle point is a nozzle at an opening in the end of a tube.

4. A method as defined in claim 3, wherein the pressure within said nozzle is ascertained by measuring the pressure in the region downstream outside said nozzle at a point which has a pressure substantially equal to the pressure within the nozzle.

5. A method as defined in claim 1, wherein said throttle point is a narrowed passage in a tube.

6. A method for determining the average temperature of the steam issuing from a combustion chamber of a steam generator, comprising the steps of:
   reacting a fuel with an oxidizer in said combustion chamber and injecting water into said combustion chamber,
   providing a throttle point at an end of said combustion chamber from which the steam issues,
   ascertaining the mass flow issuing from said throttle
   ascertaining the pressure inside said throttle point and upstream outside said throttle point, and
   determining the average temperature of the steam issuing from said combustion chamber on the basis of the mass flow issuing from said throttle point and said pressure inside and upstream outside said throttle point.

7. A method as defined in claim 6, wherein said fuel is hydrogen and said oxidizer is oxygen.

8. A method as defined in claim 7, wherein said hydrogen and said oxygen are supplied in a controlled manner in stoichiometric ratios.

9. A method as defined in claim 7, comprising the further steps of:
   determining the mass flow inputs of hydrogen and oxygen on the basis of measured values for the stoichiometric control thereof,
   measuring the mass flow input of said injected water,
   controlling the injection of said water on the basis of the mass flow measurement thereof, and
   summing the mass flows of hydrogen, oxygen and water to ascertain the mass flow issuing from said combustion chamber.

* * * * *